Jan. 28, 1958   R. A. WITTREN   2,821,211
HYDRAULIC VALVE CONTROL
Filed March 19, 1956
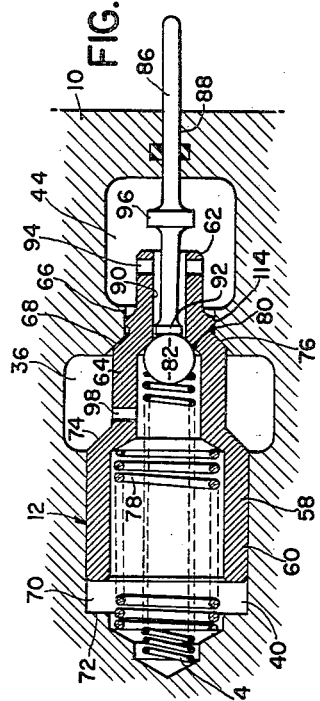
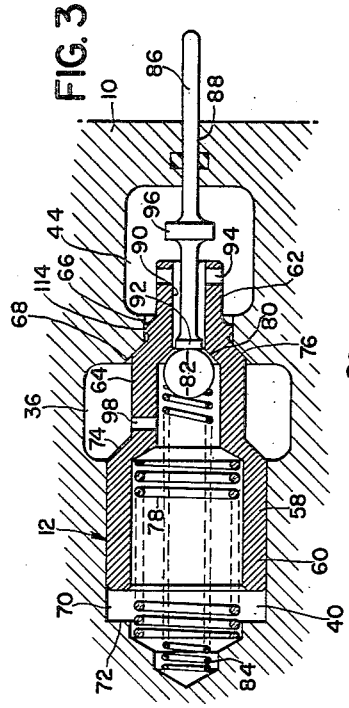
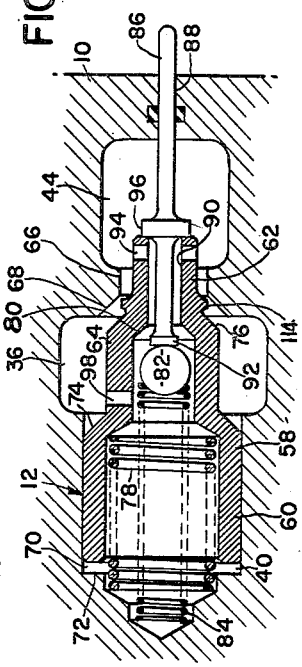
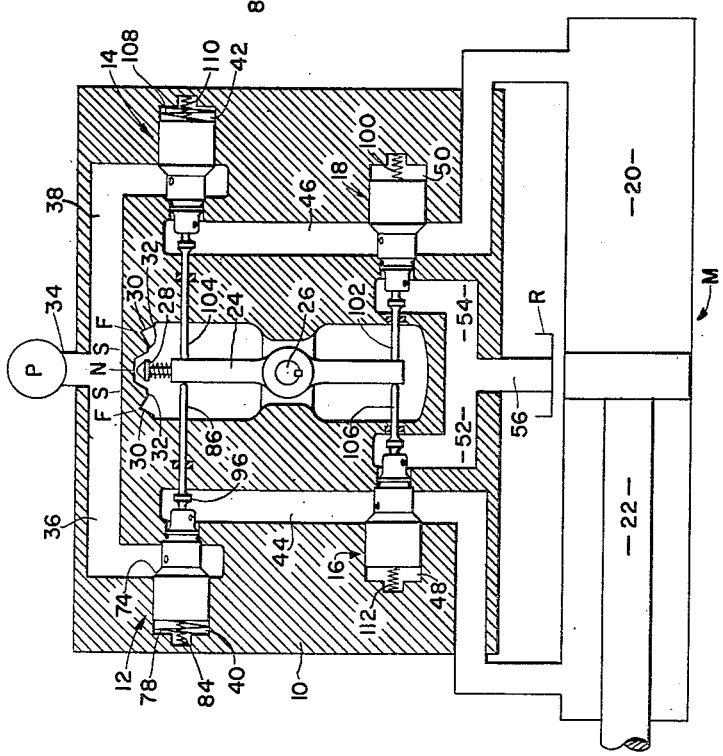
*INVENTOR.*
R. A. WITTREN

United States Patent Office 2,821,211
Patented Jan. 28, 1958

2,821,211
HYDRAULIC VALVE CONTROL

Richard A. Wittren, Cedar Falls, Iowa, assignor to Deere Manufacturing Co., Dubuque, Iowa, a corporation of Iowa Application March 19, 1956, Serial No. 572,576

8 Claims. (Cl. 137—622.5)

This invention relates to a hydraulic valve control and more particularly to a control system in which a control element or lever is automatically returned to neutral after a certain amount of travel of a motor controlled by the valve.

The general feature of automatic return to neutral has heretofore been exploited in many different ways, the fundamental object being to provide a control element movable in one direction through a range including neutral, intermediate or slow and maximum or fast positions, with the further provision of means biasing the control element for return to neutral from its intermediate or slow position, plus releasable detent means for releasably locking the control element in its maximum or fast position until a predetermined amount of travel of the motor has been obtained. In one arrangement, the attainment by the motor of its predetermined amount of travel incurs an abnormal increase in pressure in the system, with the result that the relief valve, through appropriate mechanical linkage, releases or overcomes the detent and the biasing means returns the control element to its neutral position. The problem in any case is one of balancing the detent means against the biasing return means, it being clear that if the detent means is stronger than the biasing means, some mechanical or hydraulic device is necessary to overcome the detent means. If the return biasing means is stronger than the detent means, then the effect of the detent is nullified.

According to the present invention, it is a principal object to utilize a stronger return biasing means but to employ hydraulic forces for overcoming at least a part of the effect of the biasing means so as to render the detent means effective. The accomplishment of this object entails the utilization of fluid-responsive means incorporating a fluid-pressure-differential area and the control of the fluid through a pair of restrictions in series, plus the control of the restrictions so as to utilize the pressure drop across the restrictions for creating a condition of hydraulic unbalance across the differential area. It is a further object of this invention to utilize the foregoing principles in a simple and economical valve arrangement that may be readily used with any type of hydraulic system, whether variable or constant displacement.

The foregoing and other important objects and desirable features inherent in and encompassed by the invention will become apparent to those versed in the art as a preferred embodiment of the invention is disclosed in detail in the ensuing specification and accompanying sheet of drawings, the several figures of which will be described immediately below.

Fig. 1 is a schematic view, partly in section, showing an over-all hydraulic system incorporating the improved valve control.

Figs. 2, 3 and 4 are enlarged sectional views of one of the valves, illustrating the various stages of operation of the system.

For the purposes of the present case, a single valve casing 10 is shown as containing a plurality of multi-part valves 12, 14, 16 and 18 for controlling a fluid circuit including a pump P, a reservoir R and a motor M of the cylinder and piston type including a cylinder 20 and a piston 22. The four valves are under control of a control element or lever 24, pivotally mounted on the housing on a fulcrum 26, for movement to either side of a neutral position N among either of two slow positions S and two fast or maximum positions F. The control element has detent means 28 cooperative selectively with either of two notches 30 for effecting releasable lock of the control element in one or the other of the fast or maximum positions F. The range including the distance between the two intermediate or slow positions S is determined by a pair of lugs 32, either of which must be passed by the detent means 28 in order to attain the next adjacent fast position F. Biasing means included in the valves 12, 14, 16 and 18, to be presently described in detail, operate to maintain the neutral or N position of the lever or element 24.

Although the single valve casing 10 is illustrated, it will be understood that the casing structure itself may be of any type and that shown is for purposes of illustration only. On that basis, the pump is connected to the casing 10 via a high-pressure line 34 having a pair of high-pressure branch passages 36 and 38. The passage 36 intersects a valve chamber 40 for the valve 12, and the passage 38 intersects a similar valve chamber 42 for the valve 14. The valve chambers 40 and 42 are respectively in communication with other passages 44 and 46 which ultimately lead respectively to opposite ends of the cylinder 20 of the motor M, the passage 44 intersecting a valve chamber 48 for the valve 16 and the passage 46 intersecting a valve chamber 50 for the valve 18. The valve chamber 48 communicates with a reservoir branch passage 52 and a similar relationship exists between the valve chamber 50 and a reservoir branch passage 54, the two reservoir branches leading in common at 56 to the reservoir R.

The valves 12 and 14 are of identical construction and are symmetrically arranged in the casing 10, respectively at opposite sides of the upper arm of the valve control element 24. The valves 16 and 18, although they may be identical to the valves 12 and 14, need not include all the refinements, as will presently appear. For the purposes of the present disclosure, it is deemed sufficient to define in detail just the valve 12, it being understood that the valve 14 is similarly constructed. The differences between the valves 12 and 14 and the valves 16 and 18 will be brought out as the description progresses.

As best seen in Figs. 2, 3 and 4, the multi-part valve 12 comprises an outer valve part 58 of stepped construction, having a large portion 60, a small portion 62 and an intermediate portion 64 interconnecting the portions 60 and 62. The valve casing has a small bore 66 connecting the passages 36 and 44 and affording a main valve seat 68 facing the passage 36. The chamber 40 additionally includes a larger counterbore 70 which opens at one end to the passage 36 and which is closed at its other end at 72. The large portion 60 of the outer valve part 58 is slidably carried in the counterbore 70 and the junction between the large portion 60 and the intermediate portion 64 affords a fluid-pressure-receivable area 74 exposed to the passage 36. The junction between the intermediate portion 64 and the small portion 62 affords an annular conical shoulder 76 which is seatable on and unseatable from the main valve seat 68. Biasing means in the form of a spring 78 normally maintains the seated or closed condition of the outer valve part 58.

The outer valve part 58 is tubular to accommodate the spring 78 and therefore opens at its opposite ends respectively to the passage 44 and to the counterbore 70. The outer valve part further has therein an inner valve seat 80 on which an inner valve part in the form of a ball 82 is seatable and from which the ball is unseatable, the ball being normally held in its seated or closed position by a relatively light biasing means or spring 84.

An actuator or stem 86 projects from the inner or small end of the outer valve part 58 and through an appropriately sealed aperture 88 in the valve casing 10, engaging the upper portion of the control element 24. The stem loosely fits the inner annular surface or bore 90 of the small end 62 of the valve part 58 except for the provision of land means 92 on the valve-contained end of the stem, which land means and the inner surface 90 comprise a pair of regulator portions for purposes to presently appear. The small end 62 of the valve part 58 has a plurality of radial bores 94 for enabling the free interchange of fluid between the bore 90 of the valve and the passage 44. The actuator or stem 86 has an intermediate upset portion 96 which, in conjunction with the extreme inner end of the small portion 62 comprises force-transmitting means between the valve part 58 and the stem.

When the valve 12 is closed, which means that the control element 24 is in its neutral position, the biasing means 78 acts to seat the outer valve part 58 on the main seat 68 and the biasing means 84 is effective to seat the inner valve part or ball 82 on the inner seat 80, the main seat 68 being therefore closed against fluid interchange between the passages 36 and 44. Now, disregarding for the moment the features of the present invention, the expected operation of the valve would be as follows: when the control element 24 is moved counterclockwise as seen in Fig. 1, to an extent determined by engagement between the detent 28 and the left hand lug 32, the system is set for slow-speed operation, because the stem 86 will, upon being moved inwardly by the control element 24, unseat only the valve ball 82. Slow speed operation is obtained by fluid flow from the passage 36 to the passage 44 via the interior of the valve part 58 and an orifice or restriction 98 in the wall of the intermediate portion 64 of the valve part 58. Movement of the control lever 24 additionally in the same direction, so that the detent 28 yields to the lug 32 and engages the notch 30, would cause engagement between the force-transmitting means 96 and the proximate end of the valve part 58, incurring unseating of the outer valve part 58 as respects the main valve seat 68, whereupon the rate of fluid flow from the passage 36 to 44 would increase. In either event—whether slow-speed or high-speed operation is obtained—the fluid delivered by the pump would then pass to the left hand end of the motor M, moving the piston 22 to the right. As the control element 24 is moved in the counterclockwise direction aforesaid, the lower portion thereof would open the diagonally opposite valve 18, so that exhaust fluid from the right hand end of the cylinder 20 would flow across the valve chamber 50 to the reservoir branch 54 and thence to the reservoir via the line 56. As previously stated, the valve 18 could be identical to the valve 12, it being material here only to note that the valve 18 is biased to closed position by a single small spring 100, similar to the spring 84, and that this valve has an actuator stem 102 like the actuator 86. Operation of the system to obtain travel of the piston in the direction just the reverse of that described is obtained by moving the control element 24 in a clockwise direction, in which case the valve 14 is controlled via an actuator 104 and the diagonally opposite valve 16 is controlled by an actuator 106. Since the valves 12 and 14 are identical, the valve 14 is backed up by a pair of springs 108 and 110 respectively similar to the springs 78 and 84. The valve 16 is backed up by a single spring 112 like the springs 84, 100 and 110. In any phase of operation, only two diagonally opposite valves are opened, the upper one of which supplies pump pressure to one end of the motor M and the lower one of which enables the exhaust of fluid from the opposite end of the motor.

The value of the present invention may be best appraised by considering that if the detent means 28, when engaged with the left hand notch 30, is stronger than the biasing means at 78 and 84, the biasing means could never overcome the detent without some mechanical or hydraulic force applied thereto, unless the operator manually retracted the control element. As stated above, it is not novel to provide means for automatically overcoming the detent 28. However, there is novelty in the means illustrated here, which utilizes, principally, the regulator portions 90 and 92, which establish one restriction, and the orifice 98 in the outer valve part intermediate portion 64, which effects a second restriction, the two restrictions being in series and the restriction at 90—92 being variable or controllable to incur pressure drop either across the restriction 90—92 or across the orifice 98, the incurring of the latter of which is important in conjunction with the differential or fluid-pressure-receivable area 74. By means of the foregoing general principle, hydraulic unbalance is utilized to create a hydraulic force sufficient at times to effectuate the detent, which hydraulic force decays or is destroyed in response to the substantial absence of fluid flow through the valve, whereupon the biasing means 78 becomes effective to overcome the detent 28 and to automatically return the control element 24 to neutral. As an adjunct to the foregoing, the small portion 62 of the outer valve part 58 is equipped with a fluid control portion in the form of a land 114 which requires a "higher lift" of the valve part 58.

As previously stated, when the multi-part valve 12 is closed, the outer valve part 58 is seated on the main valve seat 68 and the inner valve part 82 is seated on the inner seat 80, and the control element 24 is in its upright or neutral position. The slow-speed or intermediate position is illustrated in Fig. 3 wherein it will be seen that the actuator 86 is moved inwardly an amount corresponding to angular movement of the control element 24 until the detent 28 engages the left hand lug 32. At this point, the inner valve ball 82 is unseated from the inner valve seat 80 and the regulator portions 90 and 92 are cooperative to effect a restriction of substantially smaller area than the restriction afforded by the valve part orifice 98. Consequently, the effective pressure drop is across the restriction 90—92 and any hydraulic forces acting on the outer valve part 58 as fluid flows from the passage 36 to the passage 34 are, in conjunction with the biasing spring 78, effective to keep the outer valve part seated on the main valve seat 68. Hence, the rate of fluid flow through the valve is relatively slow and slow-speed operation of the motor M is obtained.

When the actuator 86 is moved farther inwardly (Fig. 4), which corresponds to the position of the control element 24 when the detent 28 passes the lug 32 and enters the left hand notch 30, the land means or regulator portion 92 moves additionally inwardly, not only unseating the valve ball 82 but in effect destroying the restriction at 90—92, whereupon the restriction or throttling action at 98 becomes effective to create a pressure drop across that orifice 98, whereupon is incurred a condition of hydraulic unbalance in which the pressure in the passage 36 is higher than that within the valve part 58, which hydraulic force is thereby utilized to "float" the outer valve part 58 in its opening direction to open the main valve seat 68. In its broadest aspects, the invention utilizes the hydraulic unbalance to incur sufficient hydraulic force to substantially negative the greater effect of the biasing means 78 as respects the detent 28. That is to say, recognizing that the biasing means 78 must be stronger than the detent 28 to accomplish automatic return of the control element 24 to its neutral position, it must also be recognized that if that condition exists alone, the detent 28 would be ineffective unless the forces acting in opposition thereto are either removed or minimized. It will be therefore appreciated that the amount of force that is hydraulically removed from the biasing means 78 will determine the effectiveness of the detent. Stated otherwise, if the hydraulic force acting on the area 74 is sufficient to balance against the biasing means, then the detent will be effective to maintain the fast or maximum position of the control system and, in order that the biasing means again becomes effective to overcome the detent, the hydraulic force at 74 must be removed. This is accomplished in response to the substantial cessation of fluid flow through the valve, which follows from the proposition that pressure drop across the orifice 98 depends upon the continuation of fluid flow at an appreciable rate. However, when the piston 22 reaches the end of its stroke or its travel is otherwise limited, fluid flow through the valve 12 will cease. As it does so, the pressures in the passage 36 and in the interior of the valve 12 become at least balanced, whereupon the spring 78 is effective to return the outer valve part 58 to its seated position on the main valve seat 68. As a practical matter, the design may be so calibrated that the returning or seating forces are substantially greater than those necessary merely to close the valve part 58, since those forces are utilized, via the force-transmitting means 96 and the end of the small portion 62 of the valve part 58, to act through the actuator 86 for overcoming the detent 28 and for additionally moving the control element 24 back to its neutral position. That is to say, in the absence of fluid flow through the valve, and thereupon in the absence of a pressure drop across the orifice 98, forces are again available to move the outer valve part 58 to the right from its Fig. 4 position to its Fig. 1 position.

The land or control portion 114 on the small end 62 of the outer valve part 58 tolerably fits the bore 66 so that maximum fluid flow does not begin until the valve part 58 is unseated a substantial amount from the seat 68. This affords a sufficient range of movement of the control element 24 between its slow and fast positions and increases the amount of movement of valve travel sufficient to release a conventional detent. Otherwise, the detent would have to be specially constructed. In short, the land 114 is added to obtain a high lift valve without excessive flow area. Excessive flow area would not maintain the required pressure drop across the orifice 98 in the fast position of the valve.

Various features of the invention not categorically enumerated herein will undoubtedly occur to those versed in the art, as will modifications and alternations in the preferred structure illustrated, all of which may be achieved without departing from the spirit and scope of the invention.

What is claimed is:

1. Hydraulic control mechanism, comprising: a valve casing having a first fluid passage, a bore opening at one end to said passage and at its other end having a main valve seat, an enlarged counterbore opening at one end to the valve seat and being closed at its other end, and a second fluid passage intersecting the counterbore adjacent to said valve seat; a tubular outer valve in the bore and counterbore and traversing the second passage, said valve opening at one end to the closed end of the counterbore and at its other end to the first passage and having a large portion slidably fitting the counterbore, a small portion received in the bore and an intermediate portion connecting the large and small portions and reduced as respects the large portion to afford a pressure receivable area exposed to the second passage and enlarged as respects the small portion to afford a shoulder seatable on and unseatable from the main valve seat, said intermediate portion having an orifice therethrough communicating the second passage with the interior of the valve, said valve further having an inner valve seat facing the counterbore; means biasing the valve to close the valve via seating of said shoulder on the main valve seat; an inner valve seatable on and unseatable from the inner valve seat; means biasing the inner valve to seat on said inner valve seat; an actuator stem selectively movable within the small portion of the outer valve to unseat the inner valve in varying amounts; regulator means comprising an inner cylindrical surface part of said outer valve small portion adjacent to the inner valve seat and land means on said actuator stem closely cooperative with said surface part upon minor unseating of the inner valve to afford a flow restriction of smaller area than the aforesaid orifice, so that the pressure drop across the restriction is greater than that across the orifice during fluid flow from the second passage to the first passage, whereby the outer valve remains seated, said land means being movable beyond said surface part upon major unseating of the inner valve to enlarge the restriction and thereby to cause a pressure drop across the orifice and consequently a condition of hydraulic unbalance across the pressure-receivable area of the outer valve effective to at least partially overcome the outer valve biasing means until fluid flow through the valve decreases to such extent as to destroy said hydraulic unbalance, whereby the full force of the outer valve biasing means is again available for re-seating of said outer valve.

2. The invention defined in claim 1, in which: the outer valve includes an external fluid control portion thereon at one side of the main valve seat and cooperative with the casing to delay substantial fluid flow past the main valve seat until the outer valve is unseated from said main seat a substantial amount.

3. The invention defined in claim 1, including: a control element operatively engageable with the actuator for movement in one direction from a neutral position incurring seating of both valves, to an intermediate position incurring minor unseating of the inner valve and thence to a maximum position incurring major unseating of the inner valve; the inner valve biasing means being effective via the actuator to return the control element to its neutral position from its intermediate position; said outer valve and actuator having cooperative force-transmitting portions thereon effective upon re-seating of said outer valve by said outer valve biasing means to transmit force to the element via the actuator in the direction of return of said element from its maximum to its neutral position; detent means operative to releasably lock the control element in its maximum position as long as the aforesaid condition of hydraulic unbalance exists on the outer valve; and said outer valve biasing means being stronger than the detent means so as to incur automatic return of said element to its neutral position when the hydraulic unbalance decays upon decrease in fluid flow through the valve.

4. Hydraulic control mechanism, comprising: a valve casing having fluid passages interconnected by a valve chamber; a valve control element movable in one direction through a range including neutral, intermediate and maximum positions; a multi-part valve in the chamber for controlling fluid flow across the chamber from one passage to the other and including a main valve part openable to afford maximum fluid flow, a secondary valve part openable selectively in varying amounts to afford lesser fluid flow, and an actuator part engageable between the secondary valve part and the control element to incur minor opening of the secondary valve part in the intermediate position of said element and to incur major opening of said secondary valve part in the maximum position of said element; first biasing means acting via the secondary valve part and actuator to return the element from its intermediate position to its neutral position; detent means operative to releasably hold the element in its maximum position against the force of the first biasing means; means operative between the main valve part and the actuator part for transmitting force from the main valve part to the control element via the actuator in the direction of return of said element from its maximum position to its neutral position; second biasing means acting to close the main valve and operative through said force-transmitting means to overcome the detent means for returning the element to neutral position from its maximum position; and fluid-responsive means in the valve operative upon major opening of the secondary valve part and fluid flow therethrough to incur a hydraulic force acting to open the main valve part and to overcome at least a part of the force of the second biasing means so that the detent means becomes effective to maintain the element in its maximum position, said fluid-responsive means, responding to substantial cessation of fluid flow through the valve to incur decay of said hydraulic force, whereby the force of the second biasing means is again available to overcome the detent means.

5. Hydraulic control mechanism, comprising: a valve casing having fluid passages interconnected by a valve chamber; a valve control element movable in one direction through a range including neutral, intermediate and maximum positions; a valve in the chamber openable in varying amounts to afford different rates of fluid flow from one passage to the other; an actuator part engageable between the valve and the control element to incur minor and major opening of the valve respectively in the intermediate and maximum positions of said element; biasing means acting on the valve and actuator to bias the element to its neutral position; detent means operative only in the maximum position of the element and constructed to releasably hold the element in its maximum position except for the force of the biasing means, said biasing means being stronger than the detent means; and fluid-responsive means in the valve, operative upon forcible opening of the valve by movement of the element to its maximum position and consequent fluid flow therethrough, to incur a hydraulic force acting to increase the amount of opening of the valve and to overcome at least a part of the force of the biasing means so that the detent means becomes effective to maintain the element in its maximum position, said fluid-responsive means responding to substantial cessation of fluid flow through the valve to incur decay of said hydraulic force, whereby the force of the biasing means is again available to overcome the detent means.

6. The invention defined in claim 5, in which: the fluid-responsive means comprises a fluid-pressure-receivable area on the valve and a pair of flow restrictions in series through the valve, one of said restrictions being variable to select the restriction across which pressure drop is incurred so as to initiate the hydraulic force acting on the valve by means of hydraulic unbalance across said area.

7. The invention defined in claim 6, in which: the variation of said one restriction is regulated by the amount of opening of the valve, said valve having means providing a substantial restriction upon minor opening of the valve and a lesser restriction upon major opening of the valve.

8. Hydraulic control mechanism, comprising: a valve casing having a first fluid passage, a bore opening at one end to said passage and at its other end having a main valve seat, an enlarged counterbore opening at one end to the valve seat and being closed at its other end, and a second fluid passage intersecting the counterbore adjacent to said valve seat; a tubular outer valve in the bore and counterbore and traversing the second passage, said valve opening at one end to the closed end of the counterbore and at its other end to the first passage and having a large portion slidably fitting the counterbore, a small portion received in the bore and an intermediate portion connecting the large and small portions and reduced as respects the large portion to afford a pressure receivable area exposed to the second passage and enlarged as respects the small portion to afford a shoulder seatable on and unseatable from the main valve seat, said intermediate portion having an orifice therethrough communicating the second passage with the interior of the valve, said valve further having an inner valve seat facing the counterbore; a coaxial coil spring biasing the valve to close the valve via seating of said shoulder on the main valve seat; a ball valve seatable on and unseatable from the inner valve seat; a coaxial coil spring within and encircled by the first-mentioned spring and biasing the ball to seat on said inner valve seat; an actuator stem selectively movable within the small portion of the outer valve to unseat the ball in varying amounts; regulator means comprising an inner cylindrical surface part of said outer valve small portion adjacent to the inner valve seat and an enlarged head on said actuator stem closely cooperative with said surface part upon minor unseating of the ball to afford a flow restriction of smaller area than the aforesaid orifice, so that the pressure drop across the restriction is greater than that across the orifice during fluid flow from the second passage to the first passage, whereby the outer valve remains seated, said head being movable beyond said surface part upon major unseating of the ball to enlarge the restriction and thereby to cause a pressure drop across the orifice and consequently a condition of hyraulic unbalance across the pressure-receiving area of the outer valve effective to at least partially overcome the outer valve biasing means until fluid flow through the valve decreases to such extent as to destroy said hydraulic unbalance, whereby the full force of the outer valve biasing means is again available for re-seating of said outer valve.

References Cited in the file of this patent
UNITED STATES PATENTS

| | | |
|---|---|---|
| 922,686 | Fernald | May 25, 1909 |
| 2,172,855 | Siegert | Sept. 12, 1939 |
| 2,319,069 | Krone et al. | May 11, 1943 |
| 2,360,987 | Temple | Oct. 24, 1944 |
| 2,385,016 | Mercier | Sept. 18, 1945 |